United States Patent
Trago et al.

(10) Patent No.: US 9,035,503 B2
(45) Date of Patent: May 19, 2015

(54) ENVIRONMENTALLY PROTECTED HOUSINGLESS GENERATOR/MOTOR

(75) Inventors: Bradley A. Trago, Blacksburg, VA (US); Stephen Mark Fields, Newport, VA (US)

(73) Assignee: KOLLMORGEN CORPORATION, Radford, VA (US)

( * ) Notice: Subject to any disclaimer, the term of this patent is extended or adjusted under 35 U.S.C. 154(b) by 537 days.

(21) Appl. No.: 13/091,962

(22) Filed: Apr. 21, 2011

(65) Prior Publication Data

US 2012/0267967 A1    Oct. 25, 2012

(51) Int. Cl.
*H02K 5/10* (2006.01)
*H02K 1/18* (2006.01)
*H02K 3/44* (2006.01)
*H02K 9/16* (2006.01)

(52) U.S. Cl.
CPC .............. *H02K 1/185* (2013.01); *H02K 3/44* (2013.01); *H02K 5/10* (2013.01); *H02K 9/16* (2013.01)

(58) Field of Classification Search
USPC ..................... 310/43, 45, 260, 270
See application file for complete search history.

(56) References Cited

U.S. PATENT DOCUMENTS

| | | | | |
|---|---|---|---|---|
| 2,668,925 A * | 2/1954 | Bloser | | 310/412 |
| 3,002,119 A * | 9/1961 | Lindstrom | | 310/260 |
| 3,014,145 A * | 12/1961 | Lindstrom | | 310/400 |
| 3,075,250 A * | 1/1963 | Strohm et al. | | 264/272.2 |
| 3,353,041 A | 11/1967 | Little | | |
| 3,919,572 A * | 11/1975 | Desy | | 310/45 |
| 3,984,712 A * | 10/1976 | Hill | | 310/71 |
| 4,067,562 A * | 1/1978 | Weber | | 269/71 |
| 4,651,039 A * | 3/1987 | Yamamoto et al. | | 310/87 |
| 4,742,259 A * | 5/1988 | Schaefer et al. | | 310/156.28 |
| 5,398,397 A * | 3/1995 | Johnson | | 29/596 |
| 6,069,421 A * | 5/2000 | Smith et al. | | 310/43 |
| 6,097,124 A * | 8/2000 | Rao et al. | | 310/156.48 |
| 6,278,206 B1 * | 8/2001 | Yockey et al. | | 310/71 |
| 6,809,437 B2 * | 10/2004 | Oohashi et al. | | 310/45 |
| 7,042,124 B2 * | 5/2006 | Puterbaugh et al. | | 310/89 |
| 7,566,999 B2 * | 7/2009 | Neal | | 310/54 |
| 2003/0067228 A1 | 4/2003 | Vanjani | | |
| 2007/0085426 A1 | 4/2007 | Lee et al. | | |
| 2008/0018180 A1 | 1/2008 | Neal | | |
| 2009/0066196 A1 | 3/2009 | Suzuki et al. | | |
| 2009/0229280 A1 * | 9/2009 | Doty et al. | | 62/115 |
| 2011/0074235 A1 * | 3/2011 | Leung et al. | | 310/62 |

OTHER PUBLICATIONS

International Search Report dated Jul. 30, 2012 (two (2) pages).
Written Opinion (Form PCT/ISA/237) dated Jul. 30, 2012 (four (4) pages).

* cited by examiner

*Primary Examiner* — Tran Nguyen
(74) *Attorney, Agent, or Firm* — Day Pitney LLP

(57) ABSTRACT

A stator arrangement particularly suitable for use in an air-cooled generator or other such electric machine includes a stator with an outer stator surface, an opening therein defining an inner stator surface, and longitudinally opposed stator end surfaces. Conductive coils are supported by the stator, and include end turns overlying the longitudinally opposed stator end surfaces. In order to block out environmental contaminants and prevent conductive coil shorting, protective barriers are mounted over the end turns and secured to the stator.

20 Claims, 3 Drawing Sheets

ENVIRONMENTALLY PROTECTED HOUSINGLESS GENERATOR/MOTOR

CROSS-REFERENCE TO RELATED APPLICATION

Attention is directed to commonly assigned U.S. patent application Ser. No. 13/005,010, filed Jan. 12, 2011, titled Coolant Flow Enhancing Device for Stator Coil End Turns of Fluid Cooled Electric Motor.

BACKGROUND OF THE INVENTION

1. Field of the Invention

This invention concerns a stator arrangement, usable as part of a housingless generator or other assembly, in which at least one of the outer stator surfaces may be exposed to the surrounding environment to permit air cooling.

2. Description of Related Art

U.S. Pat. No. 3,353,041 to Little discloses a laminated rotor for an electric motor including steel end caps secured to rotor end laminations to cover rotor end windings and help prevent damage to the end windings. The entire disclosure of the Little ('041) patent is incorporated herein by reference as non-essential subject matter.

SUMMARY OF THE INVENTION

A stator arrangement according to the present invention is particularly suitable for use in an air-cooled generator or other such electric machine. This stator arrangement includes a stator with an outer stator surface, an opening therein defining an inner stator surface, and longitudinally opposed stator end surfaces. Conductive coils are supported by the stator, and include end turns overlying the longitudinally opposed stator end surfaces. In order to block out environmental contaminants and prevent conductive coil shorting, protective barriers are mounted over the end turns and secured to the stator.

In one configuration, at least one of the protective barriers is an annular cup having a portion thereof affixed to one of the longitudinally opposed stator end surfaces. The protective barriers could be configured to define axial necks protruding into the stator opening and to be joined together within that opening at adjacent terminal ends. Otherwise, radially inner and radially outer portions of the protective barriers could be secured to the longitudinally opposed stator end surfaces. An additional sealant could be disposed over cup-to-stator interfaces at inner and outer diameters of each cup for added protection.

In all embodiments, the protective barriers are formed of or include waterproof, non-conductive material. One preferred material is polyphenylene sulphide. It is also possible to use a metal or metal alloy material with a plastic, epoxy, such as powder coating, or other insulator to form the protective barriers. A non-metal material avoids eddy currents produced in the material. At least one of the protective barriers advantageously includes an exit permitting passage of leads for the stator arrangement. Epoxy, which typically encases the conductive coils, can be used to at least partially secure the protective barriers to the stator. Adhesive or grease may also be used between the epoxy encapsulated coils and the protective barrier to enhance heat transfer.

In one form of the invention, the process utilized will likely include bonderizing a stack of laminations to seal the lamination stack outer and inner diameters, insulate with NOMEX or NOMEX LT, wind, form (if necessary) and lace, encapsulate (ecap), and cure. End cups are then added, with a suitable adhesive applied to the ecapped end turn. This adhesive both glues the cap into place and reduces thermal resistance from the end turn to the cup. In addition, the same adhesive (preferably), or a different adhesive, is applied to cup outer and inner diameters to create a seal between the cup and the stator lamination stack. While it is conceivable to set the caps into place when the ecap is added, it is then very tricky to vent air out of the ecap with the caps in place. The present process involves ecapping, curing the ecap, and gluing the cups onto the ecapped surfaces. This particular form relies totally on the vacuum ecap, varnished inner diameter, and so on to seal the inner diameter of the stator.

In another form of the invention, it is actually possible to dispense with ecapping the stator; instead, the stator could be varnished. After varnishing or ecapping, long necked cups can be put on. Such cups provide adequate protection. Although such might not be as thermally efficient, it is also possible to actually varnish the stator using VPI or a varnish dip, or even form mold the stator with a varnish, because the cups will protect the varnish from cracking underneath. In this other form of the invention, the stator does not necessarily need to be ecapped to work. From a practical standpoint, it is likely only non-electrically conductive cups will be usable, but the invention is not to be considered limited in this manner.

Advantages provided by the invention include allowing the level of protection of an injection molded motor to be achieved with a minimal investment in capital expense, and permitting insert molding to be avoided.

DETAILED DESCRIPTION OF THE INVENTION

Figure 1:
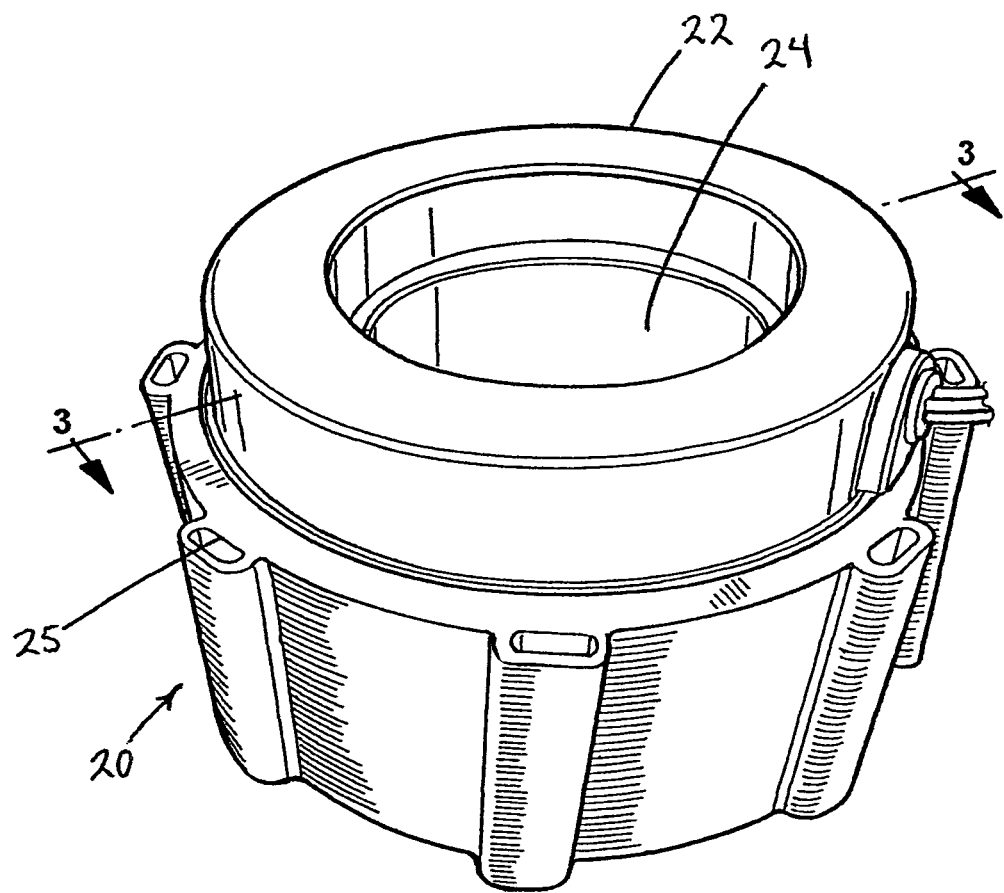
FIG. 1 is a view in perspective from above the stator of a motor, generator, or motor/generator including an annular cup covering end turns of conductive wire mounted on the stator according to one embodiment of the invention.
Figure 2:
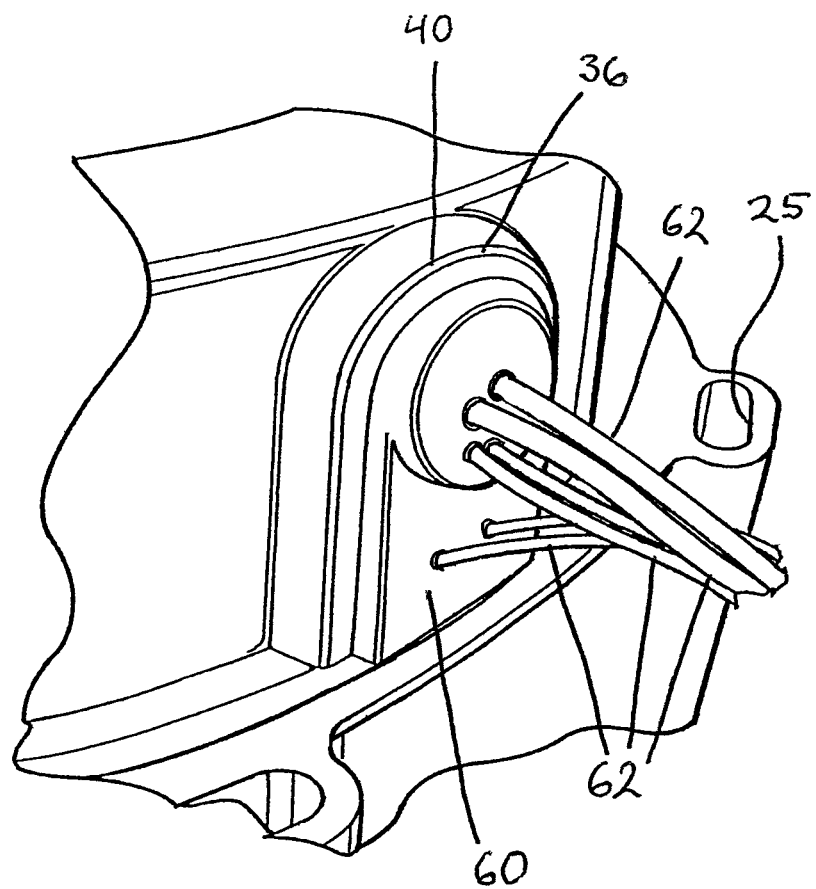
FIG. 2 is an enlarged view of part of FIG. 1 showing a grommet on the cup that permits necessary electrical connections while preventing environmental stator coil contamination.
Figure 3:
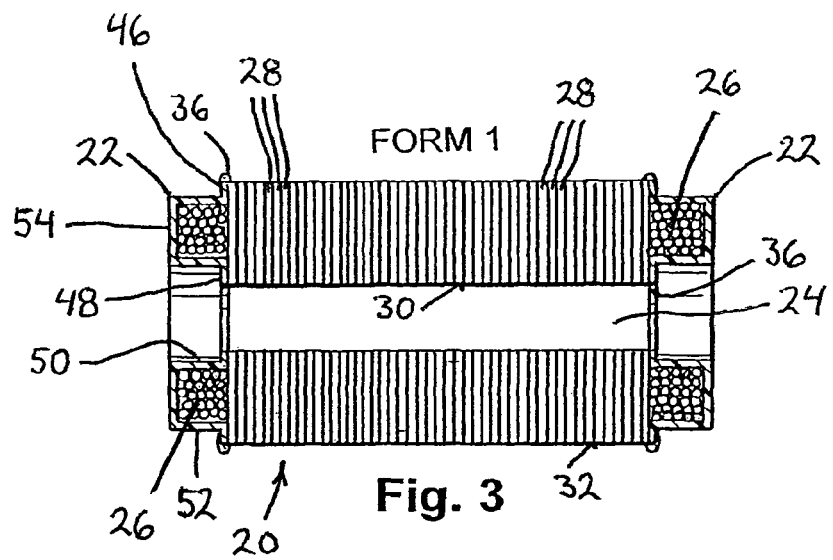
FIG. 3 is a sectional view along line III-III of FIG. 1.
Figure 4:
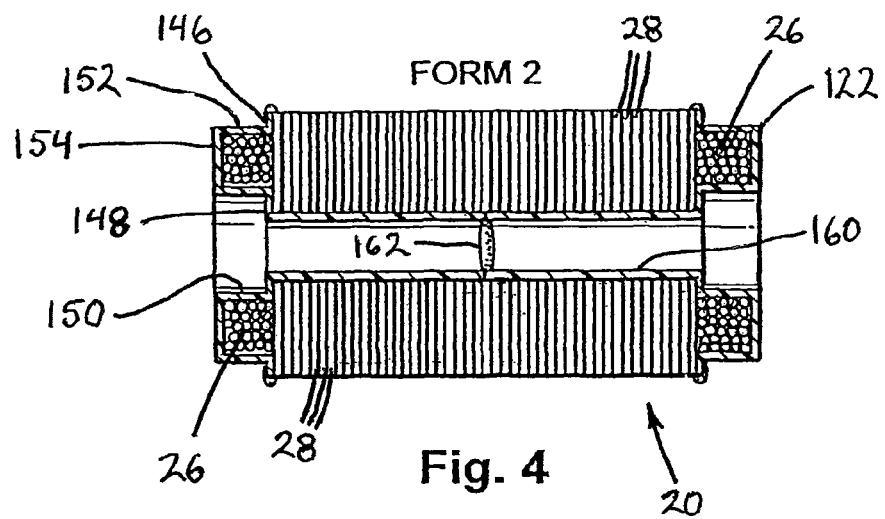
FIG. 4 is a sectional view similar to that of FIG. 3 but of a second embodiment of the invention.

The view provided by FIG. 1 shows a multiplicity of sheet laminations collectively forming the stator 20 of an overall stator arrangement. As will be described, in addition to the stator 20, the stator arrangement includes conductive wire mounted on the stator 20, and an annular cup 22 covering the end turns of the conductive wire. It is contemplated that the stator 20 will form part of an overall air-cooled electric machine, which may be a motor, generator, or motor/generator assembly. The stator 20 typically is composed of a stack of iron alloy (steel), nickel alloy, or cobalt alloy sheet laminations, which are bonded or secured together in a conventional manner. As will be recognized by those familiar with electric motors, generators, and motor/generators, the stator 20 is usable together with a rotor shaft (not shown) on which a rotor (not shown), with permanent magnets appropriately distributed therein, is secured for rotation within the central opening 24 of the stator 20. The stator 20, of course, is also usable with non-permanent magnet machines. Conductive wire coils, the end turns 26 of which are shown in FIGS. 3-4, are wound around teeth (not shown) of the stator 20 in a conventional manner. In the particular arrangement shown in FIGS. 1 and 2, the sheet laminations also collectively form mounting receptacles 25 by which the stator 20 is securable by bolts or otherwise to an object, such as a vehicle, with which the overall motor, generator, or motor/generator assembly is to be used.

As will become apparent, utilizing a stator arrangement according to the invention allows the stator 20 to form part of a housingless generator or other assembly, in which outer surfaces of the individual stator laminations 28 (FIGS. 3-4) are exposed to the surrounding environment and the stator arrangement is air-cooled. The stator may also be cooled by way of forced air, for example by pulling air through the rotor-stator air gap. To provide the stator 20 with protection from corrosion and environmental contamination, after the individual laminations 28 are joined together into a stack, the resulting lamination stack is sealed using an appropriate adhesive, such as an epoxy, a structural acrylic, a UV cured adhesive, a specialty polymer adhesive, or another such engineering adhesive, available, for example, from BONDMASTER, a division of NATIONAL ADHESIVES of Bridgewater, N.J. Sealing can also be accomplished by dunking the stack of stator laminations 28 in varnish, powder coating the stack of laminations 28, or in some other suitable way, as long as the lamination stack inner diameter surface 30 and the lamination stack outer diameter surface 32 are sealed up. Conductive wire is then wound on the teeth of the stator 20 to produce the coils having the end turns 26 illustrated in FIGS. 3-4. In this particular case, once the coils are wound, the stator is "ecapped," or encapsulated, with epoxy, and the cups are then mounted.

In detail, once the conductive wire coils have been wound on the stator 20, the coils are encapsulated, the protective end cups 22 are mounted on the end turns 26 overlying the longitudinally opposed stator end surfaces, defined by the axially outermost stator laminations 28, and bonded to the encapsulated end turns 26 using a suitable adhesive such as epoxy. After curing the adhesive, another optional adhesive sealant, such as PPG 665, available from PPG INDUSTRIES of Pittsburgh, Pa., may be used to place beads 36 of sealant over cup-to-stator interfaces at the cup outer diameter and the cup inner diameter. Such a bead 36 is also utilized to seal off a lead exit 40, described below and illustrated in FIG. 2. After being mounted in this way, each cup 22 forms a protective barrier that blocks out environmental contaminants and prevents conductive coil shorting.

The lamination stack inner diameter surface 30 may be sealed using vacuum encapsulation, resulting in sealant adhering to the slot liners and/or the stator teeth to seal the exposed surfaces of the slot liners and/or the stator teeth. A suitable thin layer of air-dry varnish, such as PD GEORGE 77X, could alternatively be used. The cups 22 mounted over the end turns 26 could consist of any suitable waterproof non-conductive material, such as polyphenylene sulphide (PPS) or another such plastic. In certain preferred arrangements, it is contemplated that the cups will be formed of molded PPS FORTRON 1144L6 material.

The cups 22 could also be made of metal or a metal alloy with a suitable insulator. Plastic has advantages, however, in that it can be easily molded to many shapes and provided with special geometric features. Plastic is also an electrical insulator, and avoids eddy currents that might otherwise be produced in a metal cup. Materials such as PPS, moreover, absorb very little, if any, water, even at elevated temperatures.

The first embodiment of the invention, identified as "FORM 1," is best illustrated in the cross sectional view provided by FIG. 3. In the configuration illustrated in FIG. 3, the end turns 26 at opposite ends of the wound stator arrangement are sealed by annular plastic end cups 22. Both of these cups 22 have essentially the same configuration, and include radially extending outer and inner circumferential flanges 46 and 48, circumferentially disposed radially inner and outer sides 50 and 52 extending axially with respect to the stator 20, and an annular base 54 interconnecting the sides 50 and 52. The stator inner diameter surface 30 is sealed by vacuum encapsulation or by way of a varnish and subsequent encapsulation. Testing has shown that the small amount of encapsulant on the stator inner diameter, aided by the much better support structure compared to the end turn area, results in significantly fewer encapsulant cracking problems at the stator inner diameter.

At least one of the end cups 22 includes the exit 40 mentioned previously for leads 62. It may be seen from FIG. 2 that this exit 40 is sealed by arranging a suitable close-fitting grommet 60 around the leads 62, and placing a bead or beads 36 of sealant in a groove surrounding the lead exit 40 of the associated cup 22. Again, beads 36 of the sealant may also be used on the cup and lamination interfaces to seal those interfaces.

Figure 5:
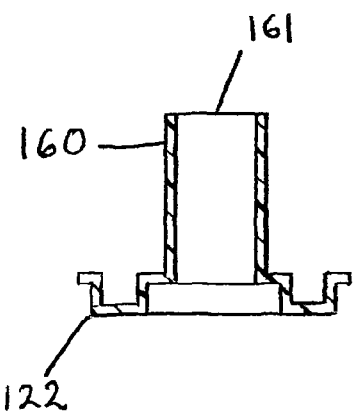
FIG. 5 is a sectional view of one of a pair of end caps used in the second embodiment.

A second embodiment of the invention, identified as "FORM 2," is best illustrated in the cross sectional views provided by FIGS. 4 and 5. It will be apparent that FIG. 5 is a cross sectional illustration of an annular cup similar to those shown in FIG. 4, but with different relative dimensions of its constituent sections. In both FIG. 4 and FIG. 5, each annular cup is identified by reference number 122 rather than by reference number 22, as in FIGS. 1-3. As FIG. 4 shows, the cups 122 of the second embodiment also have essentially the same configuration as each other, and include radially extending outer and inner circumferential flanges 146 and 148, circumferentially disposed radially inner and outer sides 150 and 152 extending axially with respect to the stator 20, and an annular base 154 interconnecting the sides 150 and 152. In the second embodiment, however, instead of mounting opposed end cups 122 strictly by way of either vacuum encapsulation or varnish application and then vacuum encapsulation, attachment of the end cups to the longitudinally endmost surfaces of the stator 20 is at least partially accomplished by way of axial tubes or necks 160 extending from radially inner flanges 148 of the annular end cups 122.

In general, production of both the FORM 1 and FORM 2 arrangements is accomplished by bonderizing the stator, inserting slot liners, winding and lacing, ecapping, ecap curing, cooling, and attaching the end cups using an adhesive. The FORM 1 arrangement relies on the ecap (using vacuum application, for example) impregnating the slot liners, which are usually NOMEX or NOMEX LT, to seal off the inner diameter.

In the FORM 2 arrangement, the cups come all the way down the inner diameter and meet, thereby avoiding reliance on the ecap impregnating the slot wedges. This is a major advantage of the FORM 2 arrangement. As the axial tubes or necks 160 are disposed in the air gap, where large fields are commonly present, the use of non-metal end cups 122 is important and preferred.

The axial tubes or necks 160 are appropriately dimensioned so that, upon placing the end cups 122 of the second embodiment over the end turns 26 at opposite ends of the wound stator arrangement, terminal ends 161 of the tubes or necks abut or nearly abut, so that the terminal ends 161 may be secured together adhesively, by heat bonding, or otherwise. In this way, the end cups 122 are secured to each other as well as to the longitudinally endmost stator surfaces, defined by the axially outermost stator laminations 28. FIG. 4 illustrates a seam 162 along which the terminal ends 161 of opposed end cups are secured together. Such a terminal end 161 is best shown in FIG. 5.

A fundamental result provided by using either the cups 22 of the first embodiment or the cups 122 of the second embodiment is to cover over the "ecap," or encapsulant. Ecap, especially epoxy formulations, are found to crack upon cooling down when curing, and to continue to crack subsequently, especially when exposed to thermal cycling. Such cracking can result in grounding or shorting of the wound conductive wire coils, especially in the area of the end turns 26, due to the resultant exposure of the end turns to salt, water, and other contaminants.

The cups 22 and 122 of the invention may thus be used to cover epoxy encapsulated end turns of a housingless generator, and, in the second form described, the cups 122 include added tube or neck pieces that also cover the lamination stack inner diameter surface 30. The cups of the FORM 2 arrangement could also be used to seal a non-ecapped motor element. The use of the cups 22 or 122 enables one to produce a generator or other machine type operable in an open air or fan cooled manner, in challenging salt water or foggy environments, at high voltage, and without failure, because cracks developed in the epoxy encapsulant are covered over. Accordingly, in its first form, the invention serves to provide a water tight covering over generator end turns to protect against water ingress, and particularly salt water ingress, through cracks in epoxy of an epoxy encapsulated generator. The second form of the invention accomplishes the same protective function, and additionally serves to completely seal an inner diameter of the stator by way of the axial tubes or necks 160 extending over the inner diameter surface 30 of the lamination stack or stator 20.

While it is desirable to provide the cups 22 with the ledges 48 and the cups 122 with the ledges 148, these ledges are illustrated in the drawing figures in usually pronounced degrees. These ledges are actually quite small, and could be essentially or even completely eliminated if appropriate.

Also, in the FORM 2 arrangement, it is possible to dispense with ecapping the stator completely, and instead to simply varnish the stator and apply the cups after varnishing by gluing the cups on.

As mentioned, the cups 122 could also be used to seal either an ecapped motor or a non-ecapped motor. The FORM 1 and FORM 2 stators both provide excellent sealing of ecapped motors, while the FORM 2 stator can be used in both ecapped and non-ecapped motors without incurring high stator injection molding expenses; instead, the cups can be purchased separately and installed. This provides for low cost cups and avoids the need for large capital investments in injection molding equipment.

It is likely that electrically non-conductive cups are most suitable for use in the FORM 2 arrangement, since the tubes or necks 160 extend through the air gap, where magnetic fields are typically high and eddy currents will be created.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A stator arrangement for an air-cooled electric machine, comprising:
    a stator with an outer stator surface, an opening therein defining an inner stator surface, and longitudinally opposed stator end surfaces,
    an adhesive that impregnates the stator and seals the outer and inner stator surfaces,
    conductive coils supported by the stator, the conductive coils including end turns overlying the longitudinally opposed stator end surfaces,
    protective barriers that are mounted over the end turns and that are secured to the adhesive impregnated stator to block out environmental contaminants and prevent conductive coil shorting, the protective barriers each including inner and outer sides, surrounding a conductive coil end turn receiving volume, and a flange, extending radially outward from the outer side, defining an outermost circumferential protective barrier edge, and
    a bead of sealant placed over each interface between the stator and the outermost circumferential edges defined by the flanges of the protective barriers.

2. The stator arrangement of claim 1, wherein said flange is affixed to one of said longitudinally opposed stator end surfaces.

3. The stator arrangement of claim 1, wherein the outermost circumferential edges defined by the flanges of the protective barriers as well as radially inner portions of said protective barriers are secured to said longitudinally opposed stator end surfaces.

4. The stator arrangement of claim 1, wherein said protective barriers are formed of waterproof, non-conductive material.

5. The stator arrangement of claim 1, wherein at least one of said protective barriers includes an exit permitting passage of leads for the stator arrangement.

6. The stator arrangement of claim 1, wherein the conductive coils are encased in epoxy or other encapsulant, and the protective barriers are at least partially secured to the stator by a sealant.

7. The stator arrangement of claim 1, wherein the adhesive is any of epoxy, an acrylic, and a polymer adhesive.

8. The stator arrangement of claim 1, further comprising adhesive or grease between epoxy or the conductive coils and at least one of the protective barriers.

9. An air-cooled electric machine having a stator arrangement comprising:
    a stator with an outer stator surface, an opening therein defining an inner stator surface, and longitudinally opposed stator end surfaces,
    an adhesive that impregnates the stator and seals the outer and inner stator surfaces,
    conductive coils supported by the stator, the conductive coils including end turns overlying the longitudinally opposed stator end surfaces,
    protective barriers that are mounted over the end turns and that are secured to the adhesive impregnated stator to block out environmental contaminants and prevent conductive coil shorting, the protective barriers each including inner and outer sides, surrounding a conductive coil end turn receiving volume, and a flange, extending radially outward from the outer side, defining an outermost circumferential protective barrier edge, and
    a bead of sealant placed over each interface between the stator and the outermost circumferential edges defined by the flanges of the protective barriers.

10. The air-cooled electric machine of claim 9, wherein said flange is affixed to one of said longitudinally opposed stator end surfaces.

11. The air-cooled electric machine of claim 9, wherein the outermost circumferential edges defined by the flanges of the protective barriers as well as radially inner portions of said protective barriers are secured to said longitudinally opposed stator end surfaces.

12. The air-cooled electric machine of claim 9, wherein said protective barriers are formed of waterproof, non-conductive material.

13. The air-cooled electric machine of claim 9, wherein at least one of said protective barriers includes an exit permitting passage of leads for the stator arrangement.

14. The air-cooled electric machine of claim 9, wherein the conductive coils are encased in epoxy or other encapsulant, and the protective barriers are at least partially secured to the stator by a sealant.

15. A stator arrangement for an air-cooled electric machine, comprising:
   a stator with an outer stator surface, an opening therein defining an inner stator surface, and longitudinally opposed stator end surfaces,
   conductive coils supported by the stator, the conductive coils including end turns overlying the longitudinally opposed stator end surfaces,
   protective barriers mounted over the end turns and secured to the stator to block out environmental contaminants and prevent conductive coil shorting, the protective barriers each including inner and outer sides, surrounding a conductive coil end turn receiving volume, and a flange, extending radially outward from the outer side, defining an outermost circumferential protective barrier edge, and
   a bead of sealant placed over each interface between the stator and the outermost circumferential edges defined by the flanges of the protective barriers,
   wherein said protective barriers are formed of waterproof, non-conductive material, and
   wherein said material is polyphenylene sulphide.

16. A stator arrangement for an air-cooled electric machine, comprising:
   a stator with an outer stator surface, an opening therein defining an inner stator surface, and longitudinally opposed stator end surfaces,
   conductive coils supported by the stator, the conductive coils including end turns overlying the longitudinally opposed stator end surfaces, and
   protective barriers mounted over the end turns and secured to the stator to block out environmental contaminants and prevent conductive coil shorting,
   wherein said protective barriers define axial necks protruding into said opening and are joined together within said opening at adjacent terminal ends.

17. An air-cooled electric machine having a stator arrangement comprising:
   a stator with an outer stator surface, an opening therein defining an inner stator surface, and longitudinally opposed stator end surfaces,
   conductive coils supported by the stator, the conductive coils including end turns overlying the longitudinally opposed stator end surfaces, and
   protective barriers mounted over the end turns and secured to the stator to block out environmental contaminants and prevent conductive coil shorting,
   wherein said protective barriers define axial necks protruding into said opening and are joined together within said opening at adjacent terminal ends.

18. An air-cooled electric machine having a stator arrangement comprising:
   a stator with an outer stator surface, an opening therein defining an inner stator surface, and longitudinally opposed stator end surfaces,
   conductive coils supported by the stator, the conductive coils including end turns overlying the longitudinally opposed stator end surfaces, and
   protective barriers mounted over the end turns and secured to the stator to block out environmental contaminants and prevent conductive coil shorting, the protective barriers each including inner and outer sides, surrounding a conductive coil end turn receiving volume, and a flange, extending radially outward from the outer side, defining an outermost circumferential protective barrier edge, and
   a bead of sealant placed over each interface between the stator and the outermost circumferential edges defined by the flanges of the protective barriers,
   wherein said protective barriers are formed of waterproof, non-conductive material, and
   wherein said material is polyphenylene sulphide.

19. A stator arrangement for an air-cooled electric machine, comprising:
   a stator with an outer stator surface, an opening therein defining an inner stator surface, and longitudinally opposed stator end surfaces,
   a varnish or powder coating that impregnates the stator and seals the outer and inner stator surfaces,
   conductive coils supported by the stator, the conductive coils including end turns overlying the longitudinally opposed stator end surfaces,
   protective barriers that are mounted over the end turns and that are secured to the varnish or powder coating impregnated stator to block out environmental contaminants and prevent conductive coil shorting, the protective barriers each including inner and outer sides, surrounding a conductive coil end turn receiving volume, and a flange, extending radially outward from the outer side, defining an outermost circumferential protective barrier edge, and
   a bead of sealant placed over each interface between the stator and the outermost circumferential edges defined by the flanges of the protective barriers.

20. A stator arrangement for an air-cooled electric machine, comprising:
   a stator with an outer stator surface, an opening therein defining an inner stator surface, and longitudinally opposed stator end surfaces,
   conductive coils supported by the stator, the conductive coils including end turns overlying the longitudinally opposed stator end surfaces,
   protective barriers formed of waterproof, non-conductive material mounted over the end turns and secured to the stator to block out environmental contaminants and prevent conductive coil shorting, the protective barriers each including inner and outer sides, surrounding a conductive coil end turn receiving volume, and a flange, extending radially outward from the outer side, defining an outermost circumferential protective barrier edge,
   a bead of sealant placed at a first interface between the stator and the outermost circumferential edges defined by the flanges of the protective barriers located at an outer diameter of the protective barrier, and
   another bead of sealant placed at a second interface between the stator and the at least one of the protective barriers located at an inner diameter of the protective barrier.

* * * * *